July 11, 1972     R. G. RUSSELL     3,676,094
METHOD OF COATING GLASS FIBERS
Filed Jan. 3, 1970     2 Sheets-Sheet 1

INVENTOR.
ROBERT G. RUSSELL
BY
Staelin & Overman
ATTORNEYS

INVENTOR.
ROBERT G. RUSSELL

United States Patent Office 3,676,094
Patented July 11, 1972

3,676,094
METHOD OF COATING GLASS FIBERS
Robert G. Russell, Granville, Ohio, assignor to Owens-Corning Fiberglas Corporation, Toledo, Ohio
Filed Jan. 8, 1970, Ser. No. 1,501
Int. Cl. C03c 25/02
U.S. Cl. 65—3
14 Claims

ABSTRACT OF THE DISCLOSURE

The method of coating glass fibers by contacting the fibers with a foam of the coating material. In one method, the foam is supported adjacent the hot bushing from which the molten streams of glass are pulled to form the filaments, so that the foam contacts the fibers before the fibers pick up any appreciable amount of water or organic materials from the atmosphere. The foam may be of organic base, so that the surface has oleophobic portions extending outward and oleophilic portions extending into the organic material. The oleophobic portions are preferably a coupling agent for the glass, and the oleophilic portions preferably have a benzene ring adjacent the terminal ends. This process can also be used to coat woven fabrics by heat cleaning the fabric and then contacting it with the foam. The foam of coating material may be positioned in the path of fibers issuing from a centrifuge to cushion and coat the fibers. The foam of coating material may also be projected into a gas stream carrying randomly oriented fibers to produce glass fiber mat, or can be spread upon the surface of the mat, and the foam broken to wet out the fibers and produce a bonded mat.

BACKGROUND OF THE INVENTION

Glass fibers for textiles are produced by allowing small molten streams of glass to issue through small orifices in the bottom of a glass melt tank following which the molten streams are pulled downwardly and then solidified into filaments. The filaments are drawn together over a guide surface to produce a strand which is then wrapped upon a revolving mandrel to produce a tightly wound coiled package. Immediately before the filaments are gathered together into a strand, they are caused to pass over an applicator surface which applies a liquid, or a gel, of a coating material to the fibers to prevent mutual abrasion.

Glass fibers for textiles are also produced from small streams of molten glass issuing from a melt tank wherein a downward flow of air pulls the molten streams of glass along in the form of a veil. The fibers solidify and are collected upon the foraminous surface of a revolving drum through which the air flow is sucked, and the veil is then removed from the surface of the drum and given a twist to provide a strand. In this process, a protective coating for the filaments is applied to the veil immediately upon removal from the perforated drum.

Batts of glass fibers for insulation materials, etc. are made by continuously flowing a stream of molten glass into a centrifuge basket the periphery of which has a plurality of small openings, and from which a large number of smaller streams of glass are thrown radially outwardly. The small streams of glass thrown from the centrifuge basket are further attenuated by a downward blast of products of combustion which carry the attenuated fibers along in the form of a veil. The binder materials which are to be used to bind the fibers together in the batt are sprayed in the form of an aqueous dispersion into the veil prior to the time that the veil is collected upon a moving conveyor surface.

In another method of making batts of glass fibers, small molten streams of glass pass between opposing steam jets which attenuate the molten streams downwardly in the form of a veil. An aqueous dispersion of binder materials is sprayed into the veil prior to the time that the fibers of the veil are collected upon a moving conveyor surface.

Relatively thin mats for reinforcing resins may be made by the batt forming processes above described. Batts may also be made by feeding relatively coarse fibers or small rods into products of combustion issuing from a burner. The hot products of combustion melt and attenuate the relatively coarse fibers into fine fibers which are then collected on a foraminous conveyor in the form of a mat. A water dispersion of a binder for the mat is sprayed into the veil formed by the products of combustion and attenuate fibers prior to being collected on a conveyor surface.

In all of the processes above described wherein binders or protective coating materials are applied to the fibers, the application of the material to the fibers is made adjacent the point where the fibers are concentrated. In all of those processes, where a water dispersion of the coating materials is used, there is a considerable amount of overspray produced which becomes distributed around the surrounding area. The gel binders are an improvement in this respect, but gels are somewhat more limiting in the maner in which they are applied to the fibers.

An object of the present invention is the provision of a new and improved method of applying coating materials to fibers which practically eliminates overspray and throw off and is not limited to location or manner of application to the fibers.

A more specific object of the present invention is the provision of a new and improved method of coating fibers wherein the materials are applied to the fibers in the form of a foam.

A still further object of the present invention is the provision of a new and improved method of coating glass fibers wherein the coating materials can be applied immediately adjacent the area where the molten streams of glass solidify and at a time when the fibers are still widely separated from each other to prevent mutual abrasion and prevent pick up of unwanted moisture and/or organic materials from the atmosphere.

Further objects and advantages of the invention will become apparent to those skileld in the art to which the invention relates from the following description of the preferred embodiments taken with the accompanying drawings.

BRIEF DESCRIPTION OF THE DRAWINGS

FIG. 3 is a cross sectional view showing foam being applied to fibers being uncoiled from a wound package of the fibers.

DESCRIPTION OF THE PREFERRED EMBODIMENTS

Figure 1:
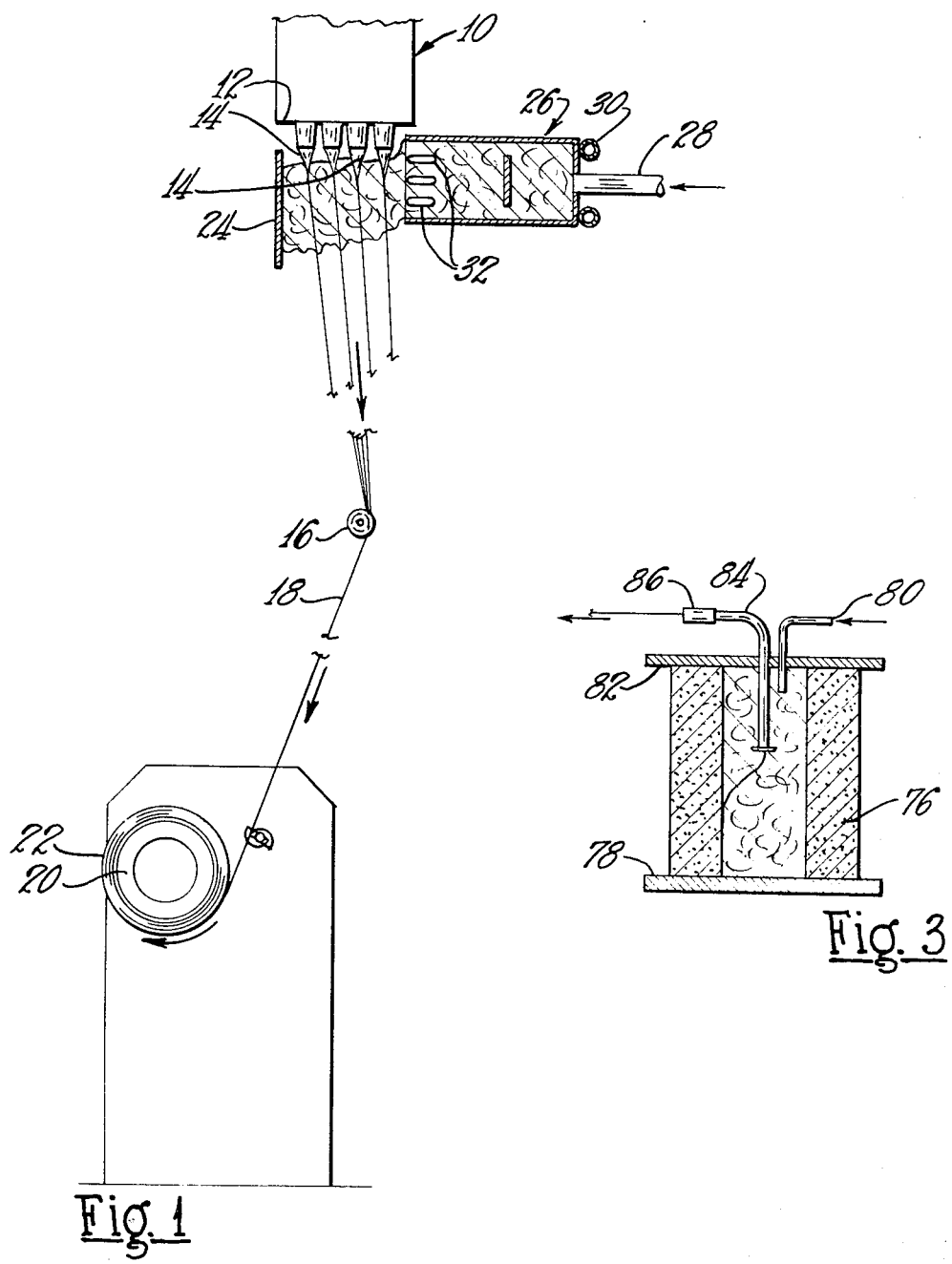
FIG. 1 of the drawings is an elevational view, with portions in section, showing the process and apparatus for applying foam to tiny streams of glass in the area of solidification.

According to the invention, it has been found, that a body of foam will be retained by a support surface even though fibers are pulled through the body of foam at great speeds, and that the fibers can be completely coated with the liquid from which the foam is made. Foams have the advantage of causing a material that is normally a liquid to take on a generally self-supporting structure having but a small amount of the liquid. Foams have the further advantage in that they provide a large surface area for the liquid. Foams have the still further advantage in that they can be made from either water systems or from organic systems to provide greatly varying surface condition.

Foams are made by injecting or bubbling a gas through a liquid. Where the liquid has a low surface tension, a foam may be produced without a foaming agent. Where the liquid has a high surface tension, as occurs with water for example, a foaming agent may be necessary. Foaming agents are materials having a polar end and a nonpolar end, such that one end will be oleophilic and the other end hydrophilic. In the case of polar solvents such as water, the polar end of the foaming agent projects down into the water and the oleophilic portion projects outwardly to form a surface. There is a dilution of the surface of the liquid to thereby reduce the high surface tension of the liquid. In the case of an organic liquid, the oleophilic portion of the foaming agent projects into the organic liquid, while the polar portion of the molecule projects outwardly to thereby decrease the amount of the organic liquid on the surface and thereby reduce its surface tension. Both types of foams, therefore, have the advantage in providing a surface of preoriented molecules, and the organic foams have the particular advantage in that there is provided preoriented molecules in which the polar portion extends outwardly.

Coupling agents for glass fibers are molecules having a polar end which is usually an inorganic radical and an opposite nonpolar end which is usually an organic portion having a functional or reactive group thereon. Organosilanes are the most widely used coupling agents, and it will be seen that with a water base coating material, the silane portions project into the water film, and the organic portions project outwardly to provide the surface first contacted by the fibers. These organic portions will usually wet out the fibers and thereafter a reorientation takes place in which the silane or siloxane end of the molecules rotate to the surface of the glass with the organic portion extending outwardly therefrom. Upon drying of such a coating, the organic portion will provide the new surface which must be wetted out by the later applied impregnating resin. When an organic base foam is used, the inorganic portion, which in most instances is the silane or siloxane portion, is already oriented for coupling to the glass such that a rotation of the coupling agent is not required. A more thorough and immediate wet out, therefore, is thus provided. According to a further aspect of the invention, the preferred foaming agent will also be a coupling agent for the glass.

According to further aspects of the invention, it has been found that foams which leave a film of surface active agent whose organic portion has a terminal phenyl ring provides a better surface for wet out for subsequently applied organic materials than do organic portions having terminal methyl groups. Preferred foaming agents, therefore, have a terminal ring adjacent one end with an adjacent functional group for reaction with the later applied organic material, and a silane or siloxane at the other end of the molecule. There is preferably provided an organic chain of three or more carbon atoms between the two terminal groups. The terminal phenyl ring need not be at the very end of the molecule, since the functional group can be attached thereto. Such a material would be an amino phenyl alkylsilane, as for example m-aminophenyl gamma propyltrimethoxy silane. The functional group can also be attached to the atom of the connecting chain to which the ring is attached. An example would be N-phenyl-gammaamino propyltrimethoxy silane. Higher alkyl groups could, of course, be substituted for the propyl groups, and functional radicals other than amines can be used. Amines are particularly useful, however, in that they will react with epoxies, polyesters, unsaturates, and other resins having substantially any type of functionality. A general formula for the preferred agents, therefore, is $X_nSi(RY)_{4-n}$ wherein Y equals functionality

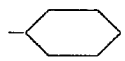

or

functionality, as for example

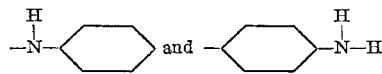

X is an OH radical or $-(OSI)_aOH$; $n$ is 1 to 3; R is an organic chain of from 3 to 20 atoms long; and $a$ is 0 to 3. Silanes having shorter R groups can be used, but are not the preferred materials, as for example chlorophenol trimethoxysilane.

The apparatus shown in FIG. 1 forms a strand of continuous filaments having a principal use in textiles. The apparatus comprises a glass melt tank 10 having a bottom plate 12 with a plurality of small openings therein through which molten streams 14 of glass flow. As the molten streams of glass 14 proceed downwardly, they solidify and then pass over a gathering shoe 16 to produce a strand 18 that is then coiled upon a revolving mandrel 20 into a coiled package 22. The plate 12 has four rows of openings therein to provide a total of 418 openings. The fibers are contacted by a foam in the area of the transistion from the molten state to the solid state. Various types of apparatus can be used to support the foam against the drag forces of the glass fibers, as for example a vertical plate positioned on either side of the four rows of glass. In the embodiment shown in the drawing, a plate 24 is provided adjacent the front side of the rows of fibers and a rectangular foam box 26 is provided adjacent the back side of the four rows of fibers. Foam is pumped to the rectangular box 26 through an inlet line 28, from the apparatus wherein the foam is produced, and because the box is supported adjacent the heat radiating portions of the glass melt tank 10 and bottom plate 12, cooling coils 30 are provided to cool the metal surfaces of the box 26. The box 26 may, in some instances, include flat cooling tubes 32 adjacent its foam outlet to both cool the foam and support it against the shearing action of the moving fibers. The foam will flow out of the box 26 across the fibers into engagement with the front plate 24, and by reason of the large surface area of the plate 24 and box 26, the foam is supported and is kept from being carried away by the shearing action of the moving fibers. It will be seen that the apparatus described causes the fibers to be contacted by the foamed coating material during or immediately after solidification, and that the foam prevents the atmosphere from reaching the surfaces of the glass fibers after solidification. It is known that the atmosphere contains small amounts of detrimental organic materials, and further that glass fibers pick up moisture from the air, if the air is not excluded from the solid glass surfaces. Foam applied in the manner above described, therefore, prevents the fibers from picking up unwanted materials from the surrounding atmosphere.

In the case where the foam is a water base material, no substantial fire or explosion hazard exists even though the foam is produced with air because the water in the foam when exposed to fire, or hot surfaces, is vaporized to produce steam which smothers any flame. In the case where the foam is produced from an organic base material, the foam is preferably produced from an inert gas, when it is desired to introduce the foam prior to or adjacent solidification of the molten glass. In some instances, it may be desired to use two or more stacked foam boxes to give sufficient support to prevent the foam from being swept away by the moving fibers. The hot surfaces of the glass fibers and the radiation from the plate 12 may produce evaporation of the organic material from the foam, but these vapors will also be accompanied by the inert gas contained within the bubbles, so that the organic vapors are continually swept away from the hot surfaces by the inert gas to avoid an explosion or fire hazard.

Figure 2:
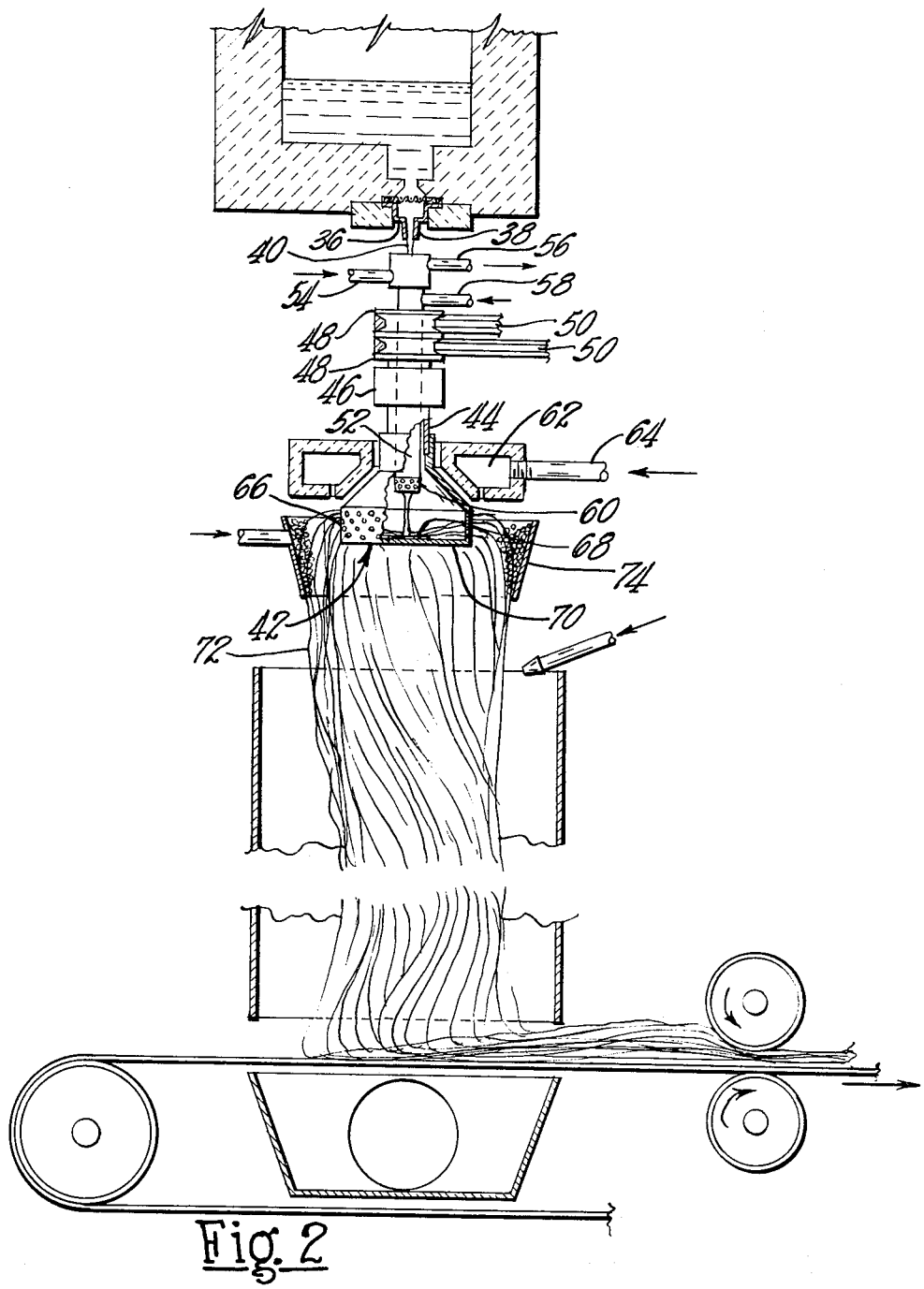
FIG. 2 is an elevational view, with portions in section, showing a method and apparatus for applying foam to glass fibers as produced by the rotary process.

FIG. 2 of the drawing depicts a rotary process wherein fiber treating materials are applied to the fibers in the form of a foam. A supply of molten glass in a forehearth or a glass melter is directed through a feeder 36 having a single orifice 38 in the form of a stream 40 of molten glass. The stream of molten glass passes downwardly into a spinner 42 which is mounted upon a hollow shaft 44. The shaft 44 is rotatable upon bearings mounted in a housing 46, and is rotatably driven by sheaves 48 which are in turn rotated by a plurality of endless belts 50. Disposed within the shaft 44 is an internal burner 52, which is also hollow so that the stream of molten glass can pass downwardly therethrough and into the interior of the spinner 42. The internal burner has concentric chambers around the center passage through which the stream of molten glass 40 passes. The annular chamber surrounding the center chamber receives and heats the gas-air mixture for the burner, and the outer chamber receives cooling water to prevent overheating of the bearings. A supply of cooling water enters the outer tube through the inlet 54 and the water is discharged from the outlet 56. Fuel-air mixture is introduced into the inner annular chamber through inlet 58, and the mixture burns as it leaves the nozzle 60.

Disposed about the spinner 42 is an annular burner 62 having an inlet 64 for a gas-air mixture. Products of combustion from the annular burner 62 pass downwardly about the outer periphery of the spinner 42 with a portion of the flame licking upon the outer edge of the spinner. The spinner 42 is provided with a perforated outer band 66, and a slinger plate 68. The bottom plate 70 of the spinner 42 is provided with several ports, not shown, through which the products of combustion from the internal burner 52 escape. During operation, molten streams of glass are thrown radially outwardly from the spinner 42 and are then given a downward component by the hot gases issuing from the burner 62. These gases carry the attenuated fibers along with the gases in what is known as a veil 72. A generally conically shaped surface 74 is positioned radially outwardly of the veil 72, and a foam of the desired coating material is continually fed into the upper end of the conically shaped surface 74. The foam flows downwardly into contact with the fibers in the vicinity adjacent their solidification and is thereafter caught by and is carried along with the fibers of the veil. The foam also lubricates the surface 74, so as to prevent abrasive contact between the fibers and the conical surface.

FIG. 3 of the drawings depicts a process wherein a strand of a coiled package is pulled through a body of foam to provide a so called after treatment for the strand. In the embodiment shown in FIG. 3, an annular coiled package of glass fiber strand 76 is placed on a suitable surface 78 and foam is introduced into the inside of the package through an inlet line 80. In the embodiment shown, the inlet is fixed to a cover plate 82 having a centrally located guide tube 84 communicating with the body of foam located within the package. The guide tube extends vertically and then curves horizontally to a coating die 86 which strips off excess foam from the strand being pulled therethrough. The strand is unwound from the inside of the package and is fed up through the guide tube 84 and through the coating die 86 to a drying and curing area, not shown. Complete coverage of the strand is assured by the contact of the foam with the coil forming the inside of the package, and also by the shearing action of the strand as it leaves the sidewalls of the package and proceeds through the center of the foam and through the guide tube.

Example 1

One hundred grams of Lotol 5440 [1] is added to a container and the contents are agitated by a Cowles mixer running at 500 r.p.m. Thereafter 5 grams of AE–60 [2] is added and the mixture agitated until it thickens. The speed of the Cowles mixer is then increased to 200 r.p.m. and the material is blended for four or five minutes to produce a thick foam.

The foamed prepolymer produced above is applied to a strand by the process shown generally in FIG. 3 of the drawings. The coiled package into which the foam is added has an internal diameter of approximately 8 inches and an outside diameter of approximately 10 inches. The strand from which it is made comprises 2040 filaments each of approximately 0.00040 inch in diameter which filaments have a precoat deposited from a water solution containing 1.0% of gammaaminopropyltrimethoxy silane coupling agent. The coated strand of the package contains approximately 1.0% by weight of the coupling agent. This strand is pulled from the package through a die 86 and is passed through an oven at 480° F. to break the foam and cause it to run around the fibers and thereafter produce a semi-cure to a generally non-tacky state. When pulled through a die 0.021 inch I.D. at 500 feet per minute, it has a loss on ignition of 10.4%. The same strand when pulled at a rate of 600 feet per minute through a die 0.022 inch in diameter has a loss on ignition of 15.1%.

Example 2

A rubber latex coating material is made from the following materials:

| Materials: | Parts by weight |
|---|---|
| Deionized water 50° F. | 1,350 |
| Caustic soda (50% solution) | 10 |
| Penacolite R2170 (75% solids) Resorcinol-formaldehyde resin emulsion | 220 |
| Formaldehyde (37%) | 74 |
| Aqua ammonia (26%) | 480 |
| Butadiene-styrene-vinyl pyridine terpolymer Gen-Tac SF (41%) | 4,500 |
| Neoprene rubber latex (50% solids) | 1,460 |
| Paraffin wax emulsion (55% solids) | 346 |

This mixture is prepared by charging the 4,500 parts of Gen-Tac to a mix tank having a propeller type agitator followed by the deionized water and this mixture is agitated at 24 r.p.m. Thereafter the caustic soda is added and the pH determined to be approximately 12. The Penacolite is thereafter added slowly and mixed for 15 minutes following which the formaldehyde is added and mixed for another additional five minutes.

A foam is made of the water dispersion described above using 100 parts by weight of the mixture and 4 parts by weight of ASE 60, also described above. The material is placed in a suitable container and mixed in a Cowles mixer at 1500 r.p.m. to a thick foam. This material is also applied to fibers using the procedure described in Example 1 with generally comparable results.

---

[1] Lotol 5440 is a natural rubber latex-resorcinol formaldehyde resin dispersed in aqueous medium to a solids of 38% by weight sold by U.S. Rubber Co., Naugatuck Chemical Division.
[2] ASE–60 is a Rohm & Haas Company tradename for an anionic crosslinked acrylic emulsion copolymer foaming agent.

Example 3

A lubricant for glass fibers is made having the following composition:

| Ingredients: | Parts by weight |
|---|---|
| Starch (55% amylose, 45% amylopectin) | 4.90 |
| Vegetable oil | 1.18 |
| Polyoxyethylene sorbitan monooleate | 0.19 |
| Carbowax 300 | 0.03 |
| Monophenoxy poly(ethyleneoxy)ethanol | 0.15 |
| Cation softener X (tetra ethylene pentamine distearate) | 0.22 |
| Hydrochloric acid to adjust pH to 5.5 | |
| Water, balance. | |

The mixture is prepared by boiling the starch in approximately one-half of the water for 20 minutes. The vegetable oil and polyoxyethylene sorbitan monooleate are mixed at approximately 150 to 170° F. and water slowly added and mixed to form an emulsion. Additional water is slowly added until an inversion takes place, following which the balance of ¼ of the total water is added. Thereafter the tetra ethylene pentamine distearate is blended in and this material is then added to the starch mixture with agitation. The balance of the water is added, and the pH adjusted with the hydrochloric acid to a pH of 5.5.

A foam is made of the above mixture by blending 5 parts of triethanolamine lauryl sulfate with 95 parts of the above lubricant mixture and blending in a Cowles mixer to produce a stiff foam. This material is pumped through the foam inlet of the apparatus shown in FIG. 1 and applied to 408 filaments having a diameter of 0.00030 inch by the process shown in FIG. 1. The filaments are uniformly coated and have a loss on ignition of approximately 1% by weight.

Example 4

A thermosetting resin binder is made by charging a reactor with 80 parts of phenol, 123 parts of a 50% water solution of formaldehyde, 19.3 parts of water and 12 parts of $Ba(OH)_2 \cdot 8H_2O$. This reactive charge is heated for a total of 7 hours during which time it is stirred by a propeller-type agitator. The charge is first heated to 110° F. and maintained at about said temperature for approximately 2 hours, and is then heated to and held at approximately 140° F. for the remaining 5 hours, at which time the refractive index of the reaction mix is 1.4620, and the infrared absorption analysis indicates it is substantially free of unreacted phenyl and also methylene groups. The reaction product is then cooled to approximately 100° F. and neutralized with sulfuric acid to a pH of about 7.5. A twenty-eight part charge of dicyandiamide is added to the neutralized reaction product, and the resulting mixture is heated to and maintained at approximately 140° F. for an additional one hour. The reaction product is then cooled to approximately 75° F. and neutralized with further sulfuric acid to a pH of approximately 7.4. Eight parts of this resin is then combined with 20 parts of pinewood pitch extract and 1 part of gammaaminopropyltriethoxy silane. Ninety-eight parts of the above blend is mixed with 2 parts of lauric-acid diethanolamide and mixed into a foam. This foam is continually delivered to the top of the conically shaped surface 74 of the apparatus shown in FIG. 2, and the fibers so formed are coated with the foam material. A mat deposited on the conveyor is cured in an oven at 350° F. to produce a uniformly bonded mat having a 17% loss on ignition and a weight of approximately 3 pounds per foot.

Example 5

A solution of 5 parts by weight of N-phenyl-gamma-aminopropyltriethoxy silane in 95 parts by weight of diacetone alcohol is made. This material is foamed by injecting nitrogen into the liquid and the foam formed is forced into the foam inlet of the apparatus shown in FIG. 1 by the nitrogen pressure. This apparatus is installed immediately next to the brushing opposite the point where the filaments have just lost their red color. The filaments are produced as described in Example 1 above, and leave this body of foam with a coating of the silane thereon. A second applicator similar to that shown in FIG. 1 is mounted several feet below the silane foam applicator. A second solution is made comprising 15 parts by weight of an epoxy prepolymer having the following formula:

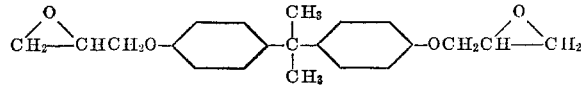

and 83% diacetone alcohol and 2% coconut fatty acid is added. This material is mixed in a Cowles blender to form a foam which is then delivered to the second applicator and applied to the fibers over the top of the silane coating previously described. The coated strand was wound into a package approximately 0.02 second after receiving the second coating during which time the amine of the silane initiates a partial cure with the epoxy radical of the second applied coating at a room temperature of 80° F. The wound package which is produced does not exhibit a blocking tendency, and the strands can be readily unwound therefrom. The strand so produced has a tensile strength in the range of 400,000 to 500,000 pounds per square inch based on the cross section of the glass, whereas those produced from conventional water base sizes have tensile strengths in the range of 200,000 to 325,000 pounds per square inch based on the cross sectional area of the glass. The glass fibers coated as above described are used to make test rods according to the procedure given in ASTM D790–497. The strands are uncoiled from the package and coated with an impregnating material comprising 25% by weight of the epoxy resin given above, 71.5% of acetone, and 3.5% of an epoxy hardener. The strand thus coated is bundled into rods which contain 25% by weight of the impregnating resin based on the dried and cured rods. The rods are cured in an oven at approximately 350° F. for one hour and then tested. The rods have a flexural strength of approximately 260,000 pounds per square inch, and a loss on ignition of approximately 17% by weight.

In the above example the initial coating of the phenolic silane causes the silane portion of the molecules to form the surface of the foam where it immediately contacts the fibers and adheres thereto leaving the benzene ring end of the molecule to project therefrom. This phenolic end has a relatively high surface energy and is quickly and completely wet out by the later applied epoxy. Any type of resin can be substituted for the epoxy resin given above, and will completely and quickly coat out over the silane treated glass fibers. The resins can be polyesters, polyurethanes, rubbers, polyvinyl alcohols, polyvinyl acetate, aldehyde condensates, resins such as phenol-formaldehyde resins, thermoplastic resins such as polyethylene, polypropylenes, vinyls, acrylates, polyamides, etc. Also in the above example it is possible to apply the epoxy in a single step by making a mixture of the resin and silane, foaming the same, and applying it in a one-step operation.

Also according to the invention, fibers sized with the phenylsilane as given by the first coating step of Example 4, may be dried, coiled into a package, and the thus coated fibers used for wet out by an impregnating resin to form a reinforced plastic.

Example 6

A finish for textile fabric glass fibers is made from the following materials in precent by weight:

| Ingredients: | Parts by weight |
|---|---|
| Soluble epoxy prepolymer | 0.5 (solids). |
| Acetic acid | 0.05. |
| Syl-Soft 16 | 3.0 (solids). |
| Polycryl 7F12 | 4.0 (solids). |
| Polycryl 7F10 | 2.5 (solids). |
| Aridye padding N colors | 2. |

"Polycryl 7F12" is a trade name of Polymer Industries, Inc. for an emulsion of a polyacrylic acid polymer having substantially no remaining active groups except carboxyl groups. "Polycryl 7F10" is a trade name of Polymer Industries, Inc. for an emulsion of an acrylic material containing an acrylic copolymer polymerized to a high molecular weight material having some amine and carboxyl groups remaining. "Syl-Soft 16" is a trade name of Dow, Corning Corp. for a copolymer of methyl hydrogen silicone and dimethyl silicone having some labile hydrogen remaining. Aridye Padding N Colors are made by Interchemical Corporation. The water soluble epoxy is a material produced in accordance with U.S. application, Ser. No. 213,133, filed July 30, 1962. This material has a substituted ammonium ion at one end of a molecular chain with an oxirane group spaced therefrom by more than approximately ten atoms. The material used had the following formula:

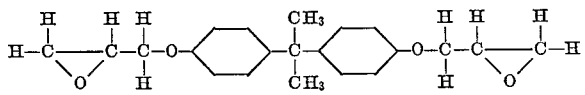

Some lower polymers of the above molecule were also present in the material.

A hundred pound mix of the material is prepared by mixing 0.05 pound of glacial acetic acid to 1.0 pound of the epoxy material dissolved in diacetone alcohol followed by the addition of two pounds of warm water added slowly while stirring until the epoxy material goes into solution. This material is put into a mix tank containing 10 pounds of water, and the alkyl hydrogen silicone (Syl-Soft 16) is added thereto and thoroughly mixed. Thereafter emulsions of the polyacrylates (Polycryl 7F12 and Polycryl 7F10) are added with stirring. The dye stuff is added and thereafter sufficient water is added to make a hundred pounds of the mix. In those instances where an anionic dye stuff is used, the pH is first raised to 8 with ammonium hydroxide. A foam of the above finish is prepared by mixing 5 pounds of ASE-60 into the finish and whipping it into a foam by means of a high speed propeller type agitator.

A textile fabric of glass fibers weighing .476 pound per square yard having a warp of 60 yarns per inch and a fill of 58 yarns per inch is heat cleaned to remove any previous size and thereafter the above foam is applied to both sides of the fabric which is then dried at 350° F. The initial contact with the heat of the oven breaks the foam and causes the liquid finish to wet out the yarn and completely coat the same, following which the finish is cured into a soft polymeric coating having a loss on ignition of approximately 1½%. In place of an oven, the foam coated fabric may be subjected to infrared heating lamps to break the foam and wet out the fibers of the fabric. Thereafter it can be sent to an oven for cure, or can be subjected to the heat of the infrared lamps for an additional period of time to cure the resin.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. The method of forming coated glass fibers comprising: attenuating molten streams of glass into fibers, producing a foam of a liquid glass fiber coating material, supporting said foam by means which permit the fibers to be drawn downwardly through said foam, and drawing said fibers downwardly through said foam to thereby cause cell walls of the foam to break and provide a foam free liquid coating on the fibers emerging from the foam.

2. The method of claim 1 wherein said liquid coating material comprises a mixture of a glass coupling agent from the group consisting of organosilanes and organosiloxanes and an organic resin prepolymer dispersed in a water phase, and said fibers are drawn through said foam to attach the silane or siloxane portion of the coupling agent to the glass and to provide the organic resin prepolymer as a coating over the coupling agent.

3. The method of claim 1 wherein said coating material comprises a coupling agent from the group consisting of organosilanes and organosiloxanes dissolved in an organic solvent to provide a foam having the silane or siloxane portion of the coupling agent on the surface of the walls of the foam, and whereby the newly formed fibers initially contact the siloxane or siloxane portion and emerge from the foam with the organo portions of the coupling agent molecules on the surface of the coated fibers.

4. The method of claim 3 wherein said organo portion of the coupling agent contains a benzene ring and wherein the coated fibers are further treated with an organic solution of an organic resin.

5. In the method of forming bonded mats of glass fibers produced from strands of molten glass thrown from holes in the periphery of a rotating spinner, the improvement comprising: dissolving an organic resin binder and a glass fiber coupling agent from the group consisting of organosilanes and organosiloxanes in an organic solvent, producing a foam thereof having cell walls with the organo portion of the coupling agent oriented into the cell wall and with the silane or siloxane portion on the surface of the cell walls, supplying the foam to the surface of a distribution plate located in the path of fibers issuing from said spinner whereby the fibers pass through to coat the fibers with coupling agent and resin binder and deplete the foam, collecting the fibers into a mat, and curing the binder to bond the fibers of the mat together.

6. The method of claim 5 wherein the organo portion of the coupling agent contains an amino group and a benzene ring.

7. In the process of producing glass fibers wherein molten streams of glass issue from openings in a heated surface and the molten streams are attenuated during cooling, the steps comprising: producing a foam of an organic glass wetting liquid and an inert gas which will not support combustion, supporting said foam adjacent said heated surface and said molten streams for contact by said attenuated fibers, and passing said fibers through the foam to cause the cell walls of the foam to be broken by heat and the fibers to liberate the inert gas and to produce a foam free film of the organic liquid on the attenuated fibers.

8. A new and impove method of coating glass fibers for bonding with a matrix resin comprising: providing an organic solution of a glass coupling agent from the group consisting of organosilanes an organosiloxanes, the organo portion of which has functionality for bonding to the matrix resin, producing a foam thereof having cell walls with the organo portion of the coupling agent oriented into the cell walls and with the silane or siloxane portion of the coupling agent on the surface of the cell walls, contacting the glass fibers with the surface of the cell walls to attach the silane or siloxane surface of the foam to the surface of the glass and to break the foam where it is in contact with the fibers to leave a foam free coating on the fibers wherein the organosilane or organosiloxane molecules remain with their silane or siloxane portion attached to the glass and their organo functional portion forming an organo functional surface for the coated fibers.

9. The method of claim 8 wherein said organo functional portion of the coupling agent contains an amine group and a benzene ring.

10. The method of claim 9 wherein said coupling agent contains a terminal amine substituted benzene ring.

11. The method of claim 9 wherein said coupling agent has a terminal phenyl substituted amino group.

12. The method of coating glass fibers with an organic resin comprising: coating glass fibers with a water solution of a coupling agent from the group consisting of organosilanes and organosiloxanes, coiling said fibers around a form to prepare a coiled package of the fibers, preparing a foam of a water emulsion of an organic resin prepolymer, unwinding the coiled package by pulling the fibers coated with the water solution of the coupling agent through said foam to effect the breaking of the foam and the coating of the fibers with the emulsified particles of prepolymer, and removing the water and curing the prepolymer on the fibers.

13. The method of claim 12 including removing the form from the coiled package, placing said foam in the space previously occupied by the form, and unwinding the package from its center by pulling the interior end of the fibers through the foam.

14. A new and improved method of coating woven glass fibers having an organic coating thereon comprising: subjecting the woven fibers to an oxidizing atmosphere and an elevated temperature sufficient to burn the organic material from the fibers and remove absorbed water from the surface of the glass, providing an organic solution of an organic resin prepolymer and a glass coupling agent from the group consisting of organosilanes and organosiloxanes, the organo portion of which has functionality for bonding with the resin prepolymer, producing a foam thereof having cell walls with the organo portion of the coupling agent oriented into the cell walls and with the silane or siloxane portion on the surface of the cell walls, applying the foam to the woven glass before any appreciable amount of water has been absorbed by the glass and causing the oriented silane or siloxane portion of the coupling agent molecules to adhere to the surface of the fibers with the organo portion of the molecules securing said resin polymer as a coating, and curing the oriented coating on the fibers.

References Cited
UNITED STATES PATENTS

| | | | |
|---|---|---|---|
| 2,673,824 | 3/1954 | Biefeld et al. | 117—126 GS |
| 2,968,278 | 1/1961 | Wolfe | 65—3 |
| 2,993,871 | 7/1961 | Shannon et al. | 117—126 GS |
| 3,025,202 | 3/1962 | Morgan et al. | 117—126 GB |
| 3,135,630 | 6/1964 | Bielinski et al. | 118—410 |
| 3,276,931 | 10/1966 | Rees | 65—3 |
| 3,498,262 | 3/1970 | Hill et al. | 117—126 GB |
| 2,533,167 | 12/1950 | Kilham | 117—65.2 |
| 3,211,684 | 10/1965 | Eakins | 117—126 GS |

WILLIAM D. MARTIN, Primary Examiner

D. COHEN, Assistant Examiner

U.S. Cl. X.R.

65—8; 117—66, 72, 126 GB, 126 GS